US009289896B2

(12) United States Patent
Cole

(10) Patent No.: US 9,289,896 B2
(45) Date of Patent: Mar. 22, 2016

(54) SECURABLE AND COLLAPSIBLE WORK STATION

(71) Applicant: JPL Investments, LLC, Santa Fe, NM (US)

(72) Inventor: Joseph W. Cole, Las Vegas, NV (US)

(73) Assignee: JPL Investments, LLC, Santa Fe, NM (US)

( * ) Notice: Subject to any disclaimer, the term of this patent is extended or adjusted under 35 U.S.C. 154(b) by 0 days.

(21) Appl. No.: 14/726,122

(22) Filed: May 29, 2015

(65) Prior Publication Data

US 2015/0336261 A1 Nov. 26, 2015

Related U.S. Application Data

(63) Continuation of application No. 13/759,590, filed on Feb. 5, 2013, now Pat. No. 9,050,718.

(51) Int. Cl.

| | |
|---|---|
| ***B23Q 3/00*** | (2006.01) |
| ***B25H 1/04*** | (2006.01) |
| ***A47B 45/00*** | (2006.01) |
| ***A47B 81/00*** | (2006.01) |
| ***A47B 83/04*** | (2006.01) |
| ***A47B 96/18*** | (2006.01) |
| ***B25H 1/12*** | (2006.01) |
| ***B25H 1/16*** | (2006.01) |
| ***B25H 3/00*** | (2006.01) |

(52) U.S. Cl.

CPC *B25H 1/04* (2013.01); *A47B 45/00* (2013.01); *A47B 81/00* (2013.01); *A47B 83/045* (2013.01); *A47B 96/18* (2013.01); *B25H 1/12* (2013.01); *B25H 1/16* (2013.01); *B25H 3/00* (2013.01); *A47B 2200/0001* (2013.01)

(58) Field of Classification Search

USPC ........................................................ 269/291

See application file for complete search history.

(56) References Cited

U.S. PATENT DOCUMENTS

| | | | |
|---|---|---|---|
| 1,678,378 | A | 7/1928 | Campbell |
| 1,860,071 | A | 5/1932 | Bodkin |
| 1,930,617 | A | 10/1933 | Huot |
| 2,353,059 | A | 7/1944 | Murray |
| 2,505,658 | A | 4/1950 | Wilson |
| 2,525,208 | A | 10/1950 | Clink |
| 2,565,784 | A | 8/1951 | Sheean |
| 2,893,749 | A | 7/1959 | Simonsen |
| 3,078,133 | A | 2/1963 | Schauer |

(Continued)

FOREIGN PATENT DOCUMENTS

| | | |
|---|---|---|
| WO | 2007090300 | 8/2007 |

OTHER PUBLICATIONS

Jack Bench Adjustable Height Workbench Plans, http://www.jackbench.com, May 23, 2013, 1 page.

*Primary Examiner* — Lee D Wilson
*Assistant Examiner* — Alvin Grant
(74) *Attorney, Agent, or Firm* — Weide & Miller, Ltd

(57) ABSTRACT

A work station includes tool containing or supporting features as well as workbench features, such as a work surface and work back. The work station is preferably mobile, permitting it to be moved or transported. In addition, the work station is preferably collapsible and securable. In one configuration, the work station has a work bench portion which can be raised or lowered relative to a base portion, wherein in the lowered position, the base portion is positioned in an interior space of the work bench portion.

16 Claims, 4 Drawing Sheets

(56) References Cited

U.S. PATENT DOCUMENTS

| | | | | |
|---|---|---|---|---|
| 3,092,428 | A | 6/1963 | Kerschner | |
| 3,208,807 | A * | 9/1965 | Becker | A47B 43/02 108/35 |
| 3,520,583 | A | 7/1970 | Case | |
| 4,120,549 | A | 10/1978 | Bureau | |
| 4,155,609 | A * | 5/1979 | Skafte | A47B 85/08 108/48 |
| 4,240,684 | A | 12/1980 | Henning | |
| 4,338,987 | A | 7/1982 | Miles | |
| 4,460,085 | A | 7/1984 | Jantzen | |
| 4,478,467 | A | 10/1984 | Tyndall | |
| 4,550,828 | A | 11/1985 | Baldwin et al. | |
| 4,589,235 | A * | 5/1986 | Anderson | E04B 2/7401 52/28 |
| 4,659,154 | A | 4/1987 | Jenkins | |
| 4,714,025 | A | 12/1987 | Wallin et al. | |
| 4,733,703 | A | 3/1988 | Cimino | |
| 4,953,601 | A | 9/1990 | Herdies | |
| 5,069,342 | A | 12/1991 | Dickinson | |
| 5,129,611 | A | 7/1992 | Grover et al. | |
| 5,221,132 | A * | 6/1993 | Combs | B25H 3/00 211/70 |
| 5,551,773 | A | 9/1996 | Cottrell | |
| 5,558,418 | A | 9/1996 | Lambright et al. | |
| 5,582,225 | A | 12/1996 | Schank | |
| 5,588,659 | A * | 12/1996 | Boes | B25H 3/04 206/378 |
| 5,634,649 | A | 6/1997 | Breining et al. | |
| 5,725,037 | A | 3/1998 | Faulhaber | |
| 5,829,501 | A | 11/1998 | DeVito | |
| 5,927,837 | A | 7/1999 | Schmidt | |
| 5,951,129 | A | 9/1999 | Stein | |
| 6,047,750 | A | 4/2000 | Jensen | |
| 6,315,376 | B1 | 11/2001 | Wiseman | |
| 6,336,692 | B1 | 1/2002 | Snyder | |
| 6,361,130 | B1 * | 3/2002 | Kardy | A47B 81/00 211/85.2 |
| 6,394,566 | B1 | 5/2002 | Slivon et al. | |
| 6,435,111 | B1 | 8/2002 | Stumpf | |
| 6,565,165 | B2 | 5/2003 | Switkes | |
| 6,578,937 | B1 | 6/2003 | Thoman | |
| 6,578,938 | B2 * | 6/2003 | Norman | A47B 43/00 206/373 |
| D480,892 | S | 10/2003 | White | |
| 6,634,668 | B2 | 10/2003 | Urffer et al. | |
| 6,817,495 | B1 | 11/2004 | Luck | |
| 6,926,136 | B1 * | 8/2005 | Lynch-Bass | A45C 11/16 206/6.1 |
| 7,278,644 | B2 | 10/2007 | Villarreal | |
| 7,338,354 | B2 | 3/2008 | Liu | |
| 7,350,549 | B2 | 4/2008 | Carter | |
| D574,628 | S | 8/2008 | Grela | |
| 7,661,685 | B2 | 2/2010 | Thibault | |
| 7,936,621 | B2 | 5/2011 | Okuda et al. | |
| 7,963,621 | B1 | 6/2011 | Ellis | |
| 8,157,337 | B2 * | 4/2012 | Manalang | B25H 3/06 211/70.6 |
| 8,215,728 | B2 | 7/2012 | Mehmen | |
| 8,534,779 | B2 | 9/2013 | Schaaf | |
| 8,944,444 | B1 * | 2/2015 | Tvrdy | B62B 3/005 280/47.35 |
| 2002/0104585 | A1 | 8/2002 | Sheahan et al. | |
| 2002/0117945 | A1 | 8/2002 | Norman et al. | |
| 2002/0180318 | A1 | 12/2002 | Bitner et al. | |
| 2003/0015851 | A1 | 1/2003 | Hahn | |
| 2003/0106614 | A1 | 6/2003 | Noden | |
| 2004/0160150 | A1 | 8/2004 | Hay et al. | |
| 2004/0195790 | A1 | 10/2004 | Wong Hahn | |
| 2005/0280228 | A1 | 12/2005 | Fernandes et al. | |
| 2006/0043687 | A1 | 3/2006 | Downs | |
| 2007/0062609 | A1 | 3/2007 | Carter | |
| 2010/0276317 | A1 | 11/2010 | Grela et al. | |
| 2014/0217044 | A1 | 8/2014 | Cole | |
| 2014/0217861 | A1 | 8/2014 | Cole | |

* cited by examiner

Fig. 2
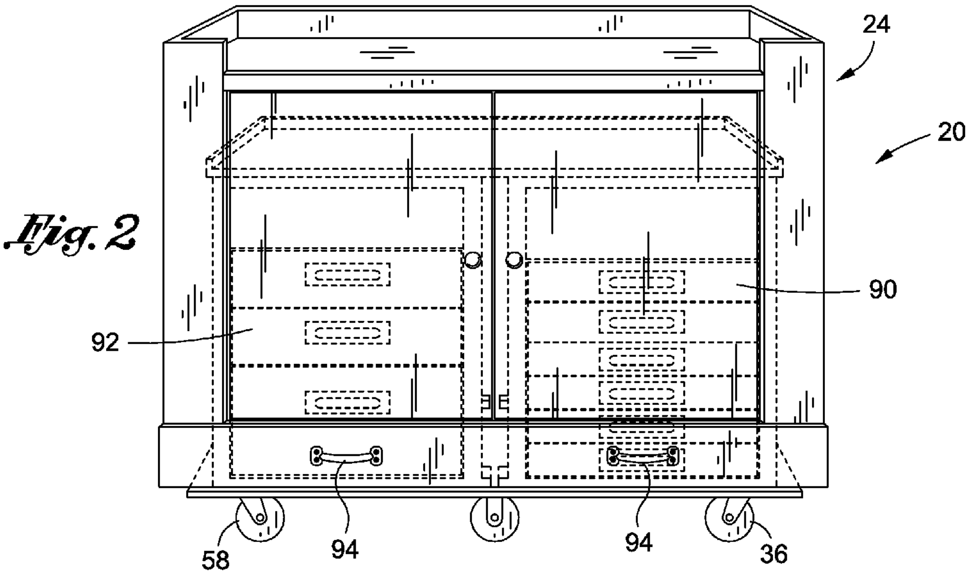
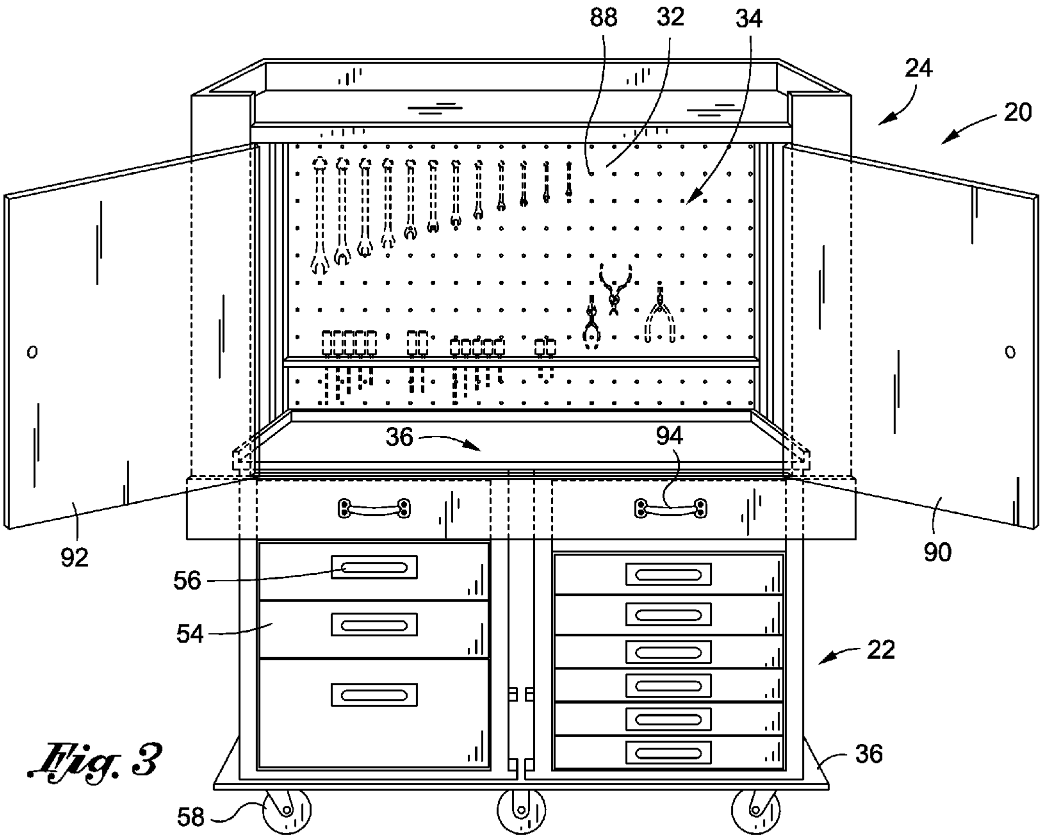
Fig. 3

SECURABLE AND COLLAPSIBLE WORK STATION

RELATED APPLICATION DATA

This application is a continuation of U.S. patent application Ser. No. 13/759,590, filed Feb. 5, 2013, issued as U.S. Pat. No. 9,050,718 on Jun. 9, 2015.

FIELD OF THE INVENTION

The present invention relates to work benches and tool chests.

BACKGROUND OF THE INVENTION

Commonly, tool users store their tools in tool chests or boxes. Such tool boxes generally comprise a housing having a plurality of drawers or compartments. The user places their tools in those compartments. The tool box often includes a handle or the like, permitting the user to transport the tools therein by picking up and carrying the tool box.

A tool user may also have a work bench. Such a workbench often comprises a raised work surface. For example, the workbench may include a generally planar work top which is supported in an elevated position by four legs. The user may place work elements, tools and the like on the work top, whereby they are supported in an elevated position.

While tool boxes and work benches each have beneficial features, they also each have substantial limitations. For example, tool boxes are generally heavy, particularly when the tool box is fairly large and/or contains more than a few tools. This makes it difficult for a user to transport their tools. In addition, tool boxes house the tools inside the housing thereof. Thus, a user can not readily see the tools which are in the toolbox.

Work benches provide a convenient work surface. Like tool boxes, however, work benches cannot conveniently be moved or transported. In addition, work benches are not designed to contain tools. Thus, a user's tool box may be in one location while the user's workbench may be in another location.

A solution to these and other problems with existing tool boxes and work benches is desired.

SUMMARY OF THE INVENTION

One aspect of the invention a work station. In general, the work station includes tool containing or supporting features as well as workbench features, such as a work surface and work back. As a result, the work station may also be referred to as a work bench, tool box, work cart or workbench. The work station is preferably mobile, permitting it to be moved or transported. In addition, the work station is preferably collapsible and securable.

In one embodiment, the work station comprises a base portion and a work bench portion. The base portion has one or more peripheral sides, defines an interior area configured to store a plurality of tools, and includes a generally planar top work surface.

The work bench portion has one or more peripheral sides, also defines an interior area, and includes a generally vertical work back at a rear of the interior area upon which a plurality of tools may be mounted.

The work bench portion is movably connected or mounted relative to the base portion. The work bench portion is configured to move between a first lowered position and a second raised position. In the lowered position, at least a portion of, and preferably substantially all of the base portion is located in the interior area of the work-bench portion. In such a position, the work station has a first height and the work station is closed or secured. In the second raised position the work bench portion is raised above the base portion whereby the work station has a second height which is greater than the first height and whereby the top work surface of the base portion is accessible and the work back extends upwardly from the top work surface of the base portion.

The work station may include a variety of other features. For example, in one embodiment, the work station includes a means for generating a lifting or biasing force. This means may include one or more springs which are designed to generate a lifting force which aids a user in lifting or raising the work bench portion from its lowered to its raised position.

Further objects, features, and advantages of the present invention over the prior art will become apparent from the detailed description of the drawings which follows, when considered with the attached figures.

DESCRIPTION OF THE DRAWINGS

FIG. 2 illustrates a work station of the present invention in a collapsed position;

FIG. 3 illustrates a work station of the present invention in a raised position;

DETAILED DESCRIPTION OF THE INVENTION

Figure 1:
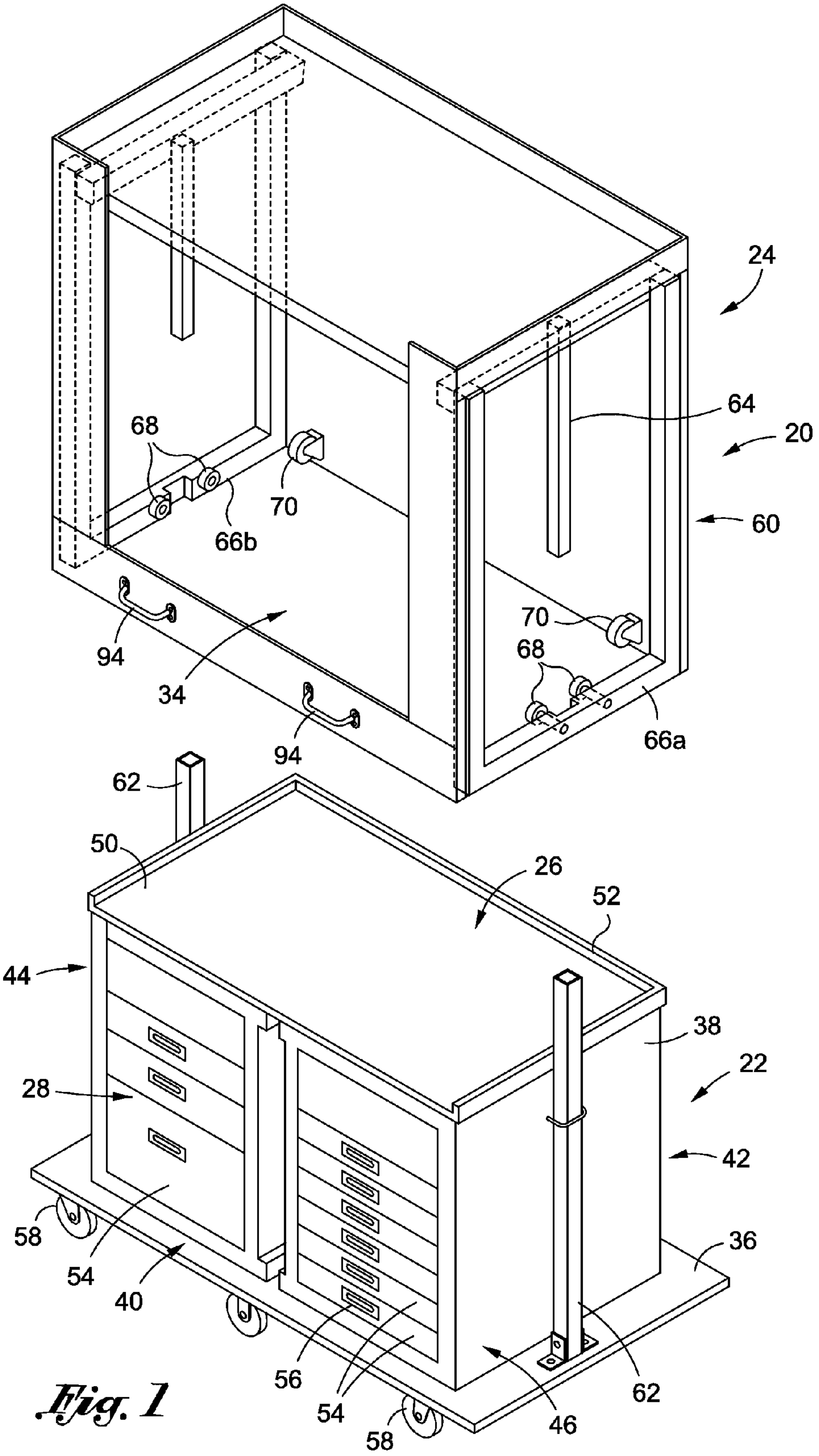
FIG. 1 is an exploded, partial assembly view of a work station in accordance with an embodiment of the present invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a work station. In general, the work station includes tool containing or supporting features as well as workbench features, such as a work surface and work back. As a result, the work station may also be referred to as a work bench, tool box, work cart or workbench. The work station is preferably mobile, permitting it to be moved or transported. In addition, the work station is preferably collapsible and securable.

One embodiment of a work station 20 in accordance with the present invention will be described first with reference to FIG. 1. As illustrated, the work station 20 has a lower, base portion 22 and an upper, work bench portion 24.

The base portion 22 preferably defines one or more interior storage areas 28 and includes a work surface 26. The work bench portion 24 preferably defines a work back 32 (see FIG. 3) and an interior area 34. The interior 34 of the work bench portion 24 is configured to accept therein at least a portion of the base portion 22, and preferably a substantial portion of the base portion 22.

As explained in greater detail below and as illustrated in FIGS. 2 and 3, the work bench portion 24 of the work station 20 is preferably movable relative to the base portion 22.

Preferably, the work bench portion 24 can be moved from a first or lowered position (as illustrated in FIG. 2) in which the base portion 22 is located in the interior area 34 of the work-bench portion 24 and whereby the work station 20 has a first height, and a second raised position in which the work bench portion 24 is raised above the base portion 22 (as illustrated in FIG. 3), whereby the work station 20 has a second height which is greater than the first height and whereby the work surface 26 of the base portion 22 is accessible and the work back 32 of the work bench portion 24 extends upwardly from the work surface 26 of the base portion 22.

In one embodiment, the base portion 22 comprises a base or platform 36. The platform 36 may comprise, for example, a generally planar rigid support. The base portion 22 also preferably comprises a housing 38. Preferably, the one or more interior storage areas 28 are defined at least in part by the housing 38.

In one configuration, the housing 38 may comprise a frame. The frame might comprise, for example, a super-structure or set of supports to which other elements are mounted. In other configurations, panels or the like may be connected to one another (such as directly or via one or more connectors) to define the housing 38.

In one embodiment, the housing 38 generally has a front 40, an opposing back 42, a first side 44, an opposing second side 46, a top 48 and a bottom. In one embodiment, the bottom may be defined by the top of the platform 36. In other embodiments, the bottom may comprise one or more elements which are separate from the platform 36. In the configuration which is illustrated in FIG. 1, the housing 38 is generally rectangular in shape and may be about 50-56 inches, and most preferably about 53 inches wide (from side to side), about 18-24 inches, and most preferably about 20 inches deep (from front to back), and 36-46, and most preferably about 42 inches tall (from top to bottom). Of course, the housing 38 might be square or have other shapes. As illustrated, the platform 36 may have slightly larger dimensions in one or more directions, such as for the mounting of other components.

As indicated, the housing 38 preferably defines one or more interior storage areas 28. In one embodiment, at least a portion of the interior area 28 is enclosed. For example, as illustrated, the first and second sides 44,46 may be enclosed, such as by panels. Likewise, the back 42 may be closed by one or more panels.

In a preferred embodiment, the work surface 26 generally encloses the top. In one embodiment, the work surface 26 has a top 50 which is generally planar and solid. The work surface 26 might be defined, for example, by a sheet of wood. However, the work surface 26 could be plastic, metal or the like. In one preferred configuration, an upwardly extending rim 52 may extend around the top 50 of the work surface 26, such as at its sides and rear. The rim 52 may be configured to aid in retaining tools and work pieces on the top 50 (by preventing them, for example, from rolling off of the back or sides of the top 50).

In a preferred embodiment, one or more storage elements are located in the storage area 28 of the base portion 22. The storage elements may comprise, but are not limited to, one or more shelves, bins, trays, drawers, or hangers. One or more of the storage elements may be lockable. Most preferably, the location, number and type of such storage elements may be changed.

In one embodiment, as illustrated, a plurality of drawers 54 is located in the interior or storage area 28 of the base portion 22. For example, the housing 38 may include or support a first column of one or more drawers 54 and a second column of one or more drawers 54. The drawers 54 in each column may be the same or different sizes (such as the same or different width) and the drawers 54 in a particular column may be the same or different sizes (such as the same or different height). Each drawer 54 may have a bottom, a pair of opposing sides and front and rear. A top of each drawer 54 may be generally open or include one or more openable panels. As illustrated, the front of the drawer 54 may define or include at least one handle 56 to aid the user in moving the drawer as described below.

In one embodiment, each drawer 54 may be movably supported by the housing 38 of the base portion 22. For example, each drawer 54 may be mounted to the housing 38 via one or more drawer sides. Preferably, such a mounting permits each drawer 54 to be moved in and out from a position in which the drawer is closed to an open position in which the drawer is extended from the housing 38 and an interior of the drawer 54 is accessible (such as via an open top thereof).

As indicated, other storage elements may be located in the interior storage area 28. For example, one or more shelves or the like may be located in the storage area 28. In another embodiment, one or more portions of the interior storage area 28 may generally be open, such as for storing large items. In such a configuration, one or more panels or doors (not shown) may be located at the front 40 of the housing 38 for selectively closing and/or locking such areas.

In the preferred configuration where the work station 20 is mobile, the base portion 22 is rollably supported. For example, the platform 36 may be rollably supported by a plurality of casters or wheels 58. Of course, the work station 20 might be movably supported by roller-balls, tracks or other elements.

In embodiment, the platform 36 is supported by six wheels 58. Three wheels 58 are preferably spaced along the width of the platform 36 at its front (as illustrated in FIG. 1) and three wheels are preferably spaced along the width of the platform 36 at its rear (not shown). In such a configuration, two wheels 58 may be located at each side or end of the platform 36 and another pair of wheels 58 may be located near the middle of the platform 36. In such a configuration, the size and/or placement of the wheels 58 may enable the platform 36 to be tipped or tilted from end to end. For example, a set of wheels 58 at one side/end may be smaller or set higher than the others, permitting the work station 20 to be tipped in that direction (thus raising the wheels at the opposite end of the platform 36 upwardly, such as to aid a user in passing the work station 20 over a cord, door sill or other obstacle).

As indicated, the work station 20 preferably includes a movable work bench portion 24. In one embodiment, the work bench portion 24 is connected to the base portion 22 and is movable relative to the base portion 22.

As briefly described above, in a preferred embodiment the work bench portion 24 defines an interior 34 for accepting at least a portion of the base portion 22. In one embodiment, as illustrated in FIG. 1, the work bench portion 24 comprises a frame 60 for supporting one or more components or portions of the work bench. So that the base portion 22 can fit within the work bench portion 24, the frame 60 is sized so that it forms an interior 34 which has dimensions at least slightly larger than the exterior dimensions of the base portion 22. For example, where the housing 38 of the base portion 22 is generally rectangular, the frame 60 may define a similar rectangular-shaped interior 34 for accepting the base portion 22 therein (of course, if the base portion 22 had other shapes, such as square, the frame 60 of the work bench portion 24 might define a square-shaped interior 34).

Preferably, the work station 20 includes means for movably mounting the work bench portion 24 relative to the base portion 22. The means for movably mounting most preferably enable the work bench portion 24 to be raised and lowered relative to the base portion 22.

In one embodiment, the means for movably mounting comprises one or more interconnected supports which can move relative to one another. As illustrated in FIG. 1, the base portion 22 may include at least one riser 62. In the preferred configuration, at least one riser 62 is located at each side 44,46 of the housing 38. The risers 62 may rest upon and be connected to the platform 36. Each riser 62 preferably has a first end which is connected to or rests upon the platform 36 and a second end which is located above the platform.

The work bench portion 24 preferably includes one or more extensions 64. Each extension 64 is configured to engage one of the risers 62, such as by slidably fitting into a hollow interior of the riser 62. As illustrated, the frame 60 of the work bench portion 24 includes a first end frame 66*a* and a second end frame 66*b*. The end frames 66*a,b* may comprise, for example, generally rectangular supports. In one embodiment, an extension 64 extends downwardly from a top portion of each end frame 66*a,b*, such as generally centrally. Each extension 64 has a free end which engages a mating riser 62, such as fitting into the riser. In such a configuration, the extensions 64 are movable relative to the risers 62 in telescopic fashion, as described in more detail below.

Of course, the extensions 64 might engage the risers 62 in other manners. For example, the extensions 64 may fit over (rather than in) the risers 62. In other embodiments, the extensions and risers 62 might engage on another via tracks or the like. For example, the risers 62 might define slots and the extensions 64 might include outwardly extending pins, a "T"-shaped extension or the like which fits into the slot.

The means for movably mounting may also include one or more guide elements. In one embodiment, one or more wheels, tracks or the like may guide the movement of the work bench portion 24 relative to the base portion 22, such as to ensure that the work bench portion 24 moves vertically (thus limiting tipping, binding and the like).

Figure 4:
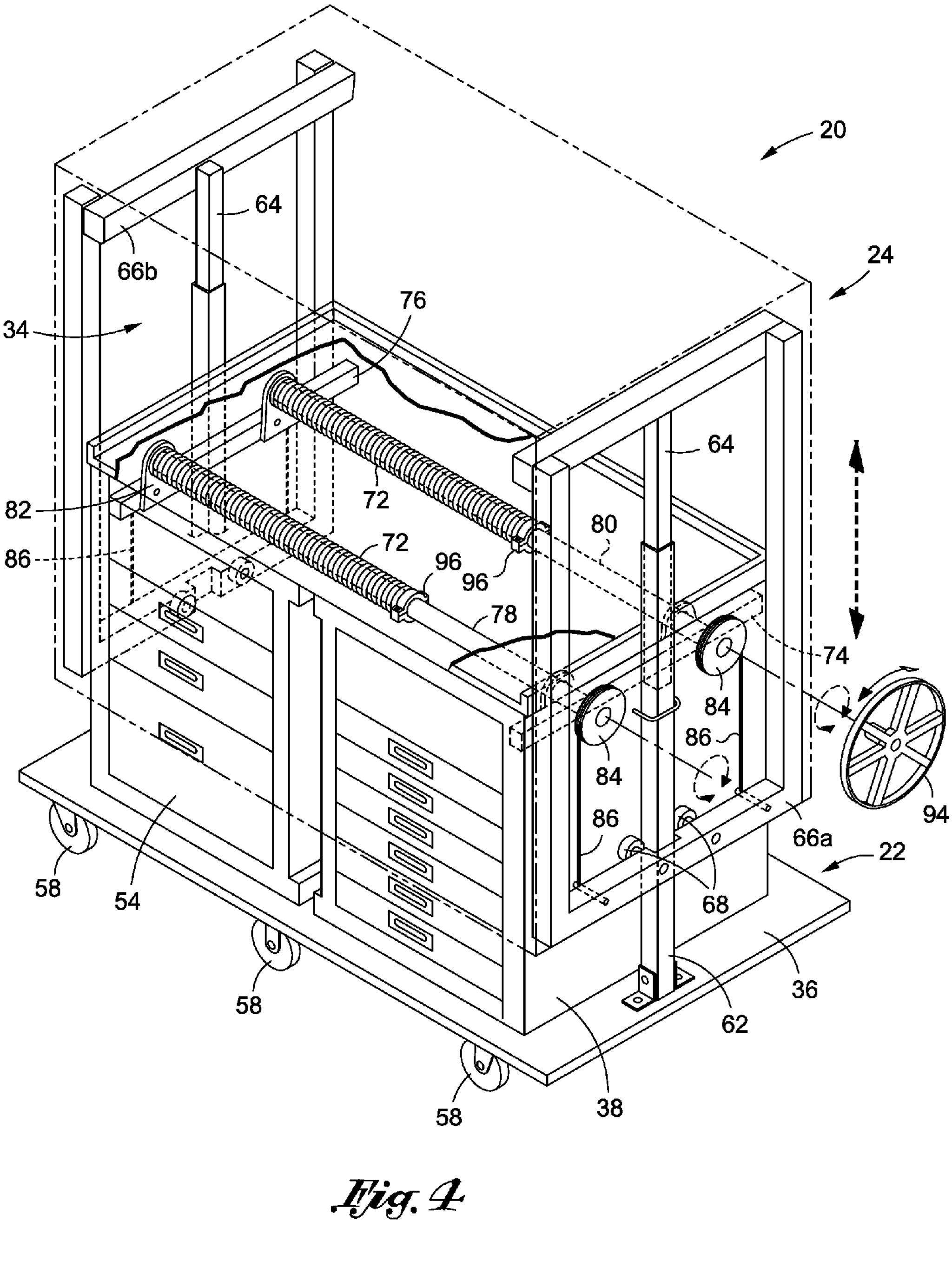
FIG. 4 illustrates a work station of the present invention with certain portions thereof to expose internal components.

For example, as illustrated in FIG. 1, pairs of wheels 68 may be mounted to the end frames 66*a,b* of the work bench portion 24, such as at a lower portion thereof. These wheels 68 may be configured to engage opposing sides of a riser 62, as illustrated in FIG. 4. In one embodiment, one or more wheels 70 may also be located at a back portion of the work bench portion 24, such as for engaging the back 42 of the base portion 22. Of course, other guide elements might be used, such as other or additional wheels, slides, tracks or the like.

In one embodiment, the work station 20 includes mean for biasing the work bench portion 24. As will be appreciated, due to gravity, the work bench portion 24 would normally be biased towards its lowered position as illustrated in FIG. 2. Due to the weight of the work bench portion 24 a user might find it difficult to raise the work bench portion 24 to its position as illustrated in FIG. 3. Thus, in a preferred embodiment, the work station 20 includes a means for biasing the work bench portion 24 to its upper position. Preferably this means does not, by itself, result in the work station 20 moving from its lower to its upper position. Instead, the means preferably provides a biasing force in the upward direction, though such biasing force is insufficient to actually move the work bench portion 24 upwardly without user assistance.

In one embodiment, the means for biasing comprises first and second springs 72, as best illustrated in FIG. 4. In one embodiment, the housing 38 of the base portion 22 includes at least first and second mounts 74,76. The mounts 74,76 preferably support first and second shafts 78,80. Preferably, the shafts 78,80 are located in the interior area 28 of the base portion 22, such as just below the work surface 36. The mounts 74,76 may comprise, for example, two generally horizontal supports and pairs of shaft mounts 82 which rotatably support the shafts 78,80.

In one embodiment, the ends of the shafts 78,80 extend outwardly of the sides 44,46 of the base portion 22. A pulley 84 is preferably mounted at each end of both shafts 78,80. A cable 86 connects each pulley 84 with the frame 60 of the work bench portion 24, such as one of the end frames 66*a,b* thereof.

One of the springs 72 is preferably connected to each of the shafts 78,80. In one embodiment, each spring 72 comprises an elongate coil spring which is configured to fit over the exterior of its associated shaft 78,80. The springs 72 are mounted or connected to the shafts 78,80 so as to rotatably bias the shafts 78,80, such as to provide a lifting force. This lifting force is applied through the pulleys 84 and cables 86 to the work bench portion 24, thus providing a lifting force to the work bench portion 24. Additional aspects of the means for biasing are described below.

As indicated above, the work bench portion 24 preferably includes a work back 32. In one embodiment, the work bench portion 24 has generally opposing first and second sides and a generally opposing front and back, in similar fashion to the base portion 22. In one embodiment the work back 32 is located at the back of the work bench portion 24. The work back 32 may, for example, be connected to and span the two end frames 66*a,b*.

In a preferred embodiment, the work back 32 comprises one or more generally planar panels. Preferably, the panels are configured to support one or more tools, work pieces or other elements. As one example, the work back 32 may comprise one or more peg boards. These boards are generally planar and define a plurality of apertures 88 there through. The apertures 88 are configured to accept tool mounts, such as pins, hangers or the like.

The work back 32 may be constructed from various materials, including wood. In a preferred embodiment, the work back 32 is generally opaque. However, in other embodiments, the work back 36 might be generally transparent, thus permitting light from behind the work station 20 to illuminate the interior 34 and permitting a user to see through the work back 32 to the area behind the work station 20.

In a preferred embodiment, the work bench portion 24 may include one or more side panels. The side panels are preferably cover the end frames 66*a,b* and enclose the sides of the work bench portion 24.

The side panels may have various configurations. Again, the side panels may be opaque or transparent. Where the side panels are used to generally enclose the sides of the work bench portion 24, the side panels are preferably opaque. The side panels might comprise, for example, peg boards or other elements which are preferably designed to store, support and/or mount one or more tools, work pieces or the like.

Likewise, in a preferred embodiment, the top of the work bench portion 24 is preferably closed. In one embodiment, the top comprises one or more panels, such as panels which are connected to the end frames 66*a,b* or other portions of the frame 60 of the work bench portion 24.

The work station 20 may have a variety of other features or elements. For example, one or more work lights might be mounted to the work station 20. For example, one or more lights might be located at the top of the work bench portion 24. These lights might be arranged to project downwardly into the interior 34, or to the front, back and/or sides of the work station 20, such as to illuminate a work area which surrounds the work station. Of course the number and type of lights which are associated with the work station 20 might vary (LED, florescent, incandescent, etc.).

The work station 20 may include one or more power sources. Such power source may be self-contained, such as in the case of one or more batteries which might be mounted to or supported by the work station 20. Such batteries might, for example, provide a 12V DC power source. In other embodiments, the work station 20 might include one or more power cables or jacks. Power might be supplied to these cables or jacks, such as from an outside power source, such as via a 120 AC power source. For example, a power jack may be mounted to the work station 20, which power jack may include or be connected to a power cable which is plugged into an adjacent wall jack.

As illustrated in FIG. 3, one or more doors or panels may be provided for selectively closing the front of the work bench portion 24. In the embodiment illustrated, first and second front doors 90,92 may be configured to selectively close the front of the work bench portion 24. In one embodiment, a first door 90 may be hingedly or rotatably mounted to one end frame 66*a* at the first side of the work bench portion 24, and a second door 92 is similarly mounted to the end frame 26*b* at the second side of the work bench portion 24.

In one embodiment, the interior area 28 of the base portion 22 might be accessible from the rear of the work station 20. For example, one or more of the shelves, drawers or other storage elements might be configured to open or slide outwardly of the rear of the work station 20. In one preferred embodiment, the shelves, drawers or other storage elements may be movable towards the front or rear of the work station 20. Such a configuration has a number of advantages. First, if a user is standing at the front of the work station 20 at the work surface 26, a second user might move the shelves, drawers or other storage elements to the rear or otherwise access tools or parts in the interior area 28 from the rear, without interfering with the first user (without such a feature, the first user would have to move away from the work station 20 in order to provide space to open the shelves or drawers towards the front of the work station 20). In addition, the ability to access tools or parts in the interior area 28 from the rear of the work station 20 provides convenient access thereto (as opposed to having to reach to the back of the drawer, shelf or other storage element from the front of the work station 20, which may be a substantial distance). Of course, in such a configuration the back of the work station 20 may include one or more movable panels or doors for selectively closing/locking the rear thereof but still permitting access to the interior area 28 from the rear of the work station 20. In such a configuration, certain drawers, shelves or other storage elements might be accessible from or move outwardly of the front of the work station 20, while others are accessible from or move outwardly of the rear of the work station 20.

For example, at a particular horizontal location, a first drawer might extend from approximately the mid-point of the work station 20 to the front thereof and be configured to open to the front, while a second drawer might extend from approximately the mid-point of the work station 20 to the rear thereof and be configured to open to the rear (i.e. the drawers are in back-to-back relationship). One advantage to this configuration is that the entire depth of the interior area 28 is utilized but access to thereto is much more convenient.

The first and second doors 90,92 may be configured to rotate between a first, closed position and, as illustrated in FIG. 3, a second, open position. When in their closed position, the doors 90,92 may be lockable, such as to prevent access to the interior 34. For example, one or more locking members or elements might be used to connect the doors 90,92 to one another (such as via mounts and a padlock, rotating key lock, etc.) and/or such locking member or elements might be used to lock the doors 90,92 to frame 60 of the work bench portion 24.

As indicated herein, in a preferred embodiment the work station 20 is mobile, such as by mounting it upon one or more wheels. In one embodiment, one or more brakes or similar elements may be provided for securing the work station 20 in a particular location. For example, a brake may be provided with one or more of the wheels, which brake can be engaged or dis-engaged by the user. Of course, other types of brakes might be used, such as a foot which may be rotated from a retracted position to a use position in which a portion thereof engages the ground. In other embodiments, one or more motors (such as electrically-powered motors) might be provided for powering one or more of the wheels. One or more user controls might be provided for controlling the motors, such as to drive and/or turn the wheels.

The work station 20 of the invention has numerous advantages. First, the work station 20 is configured to store various tools, in a manner similar to a tool box or chest. For example, the work station 20 includes a storage space at which tools may be stored. This storage space includes the interior area 28 of the base portion 22, such as within the one or more drawers 54. In addition, tools may be stored on the work back 32 or the like. Advantageously, the tools may easily be transported owing to the mobile configuration of the work station 20. For example, the tools may be rolled along with the work station 20 from one location (such as within a garage) to another location (such as outside a garage to a driveway to work on a car).

The work station 20 also includes a work surface 26. Thus, the work station 20 can be used to support work elements. Because the work surface 26 is part of the work station 20, the work surface 26 is also mobile and can thus, unlike conventional work benches, easily be transported or moved from one location to another.

Advantageously, the work surface 26 is provided at the same location where the tools are stored: at the work bench itself. Thus, when the work station 20 is moved, the work surface 26 and the associated tools move so that they are, at the same time, at the same new location.

Another advantage of the work station 20 is that it is collapsible. Preferably, the work station 20 has a first collapsed position and second raised position. FIG. 2 illustrates the work station 20 in its collapsed position. In this position, the total height of the work station 20 is preferably only about 42-56 inches. In this position, the work station 20 occupies a reduced amount of space, such as for storage. For example, in this position the work station 20 might be stored under shelving or other elements within a garage or the like. In addition, in this position the work station 20 can be more easily transported. In particular, because of its lower profile in its collapsed position, the work station 20 is more stable when it is rolled or moved. In addition, when a user pushes the work station 20, the reduced height of the work station 20 allows the user to see over the work station, such as to spot obstacles, doorways and other objects which the user must navigate.

This aspect of the invention is particularly advantageous. Because the work station 20 is preferably mobile, a user may desire to move it from location to location. For example, a user might roll the work station 20 through doorways, down narrow hallways, between airplanes, automobiles or other machinery, or into enclosed spaces such as the back of a truck, a van or other cargo compartment. Because the work station 20 is collapsible, the user can easily see over the work station 20 to safely navigate the work station 20.

As indicated above, in its collapsed position, at least a portion of the base portion 22 extends into the interior area 34 of the work bench portion 24, as best illustrated in FIG. 2. In one embodiment, a majority of the base portion 22 (and preferably the entire housing 38 thereof) extends into or fits within the work bench portion 24. As illustrated, a bottom of the work bench portion 24 may extend down to the platform 36 of the base portion 22. In this configuration, substantially all of the housing 38 of the base portion 22 is located within the work bench portion 24.

As also indicated, in a preferred embodiment, the work station 20 can be moved to a raised position, as best illustrated in FIG. 3. Most preferably, in this position the work surface 26 of the base portion 22 is accessible, as is the work back 32 of the work bench portion 24. In particular, the work back 32 extends upwardly from the work surface 26. The interior area 34 of the work bench portion 24 serves as a work area above the work surface 26. In addition, the drawers 54 and the other storage areas of the interior space 28 of the base portion 22 are accessible.

In a preferred embodiment, the work station 20 can be moved from its collapsed condition to its raised position by raising the work bench portion 24 relative to the base portion 22. As indicated above, in one embodiment, means are provided for aiding a user in changing the condition of the work station 20. In particular, the means for biasing generates a force which aids a user in lifting the work bench portion 24. In one embodiment, one or more handles 94 may be associated with the work bench portion 24 for gripping by a user in moving the work bench portion 24. In the embodiment illustrated, first and second handles 94 are located near the bottom of the front of the work bench portion 24.

In this configuration, the springs 72 generate a biasing force which is transmitted through the shafts 78,80 to the pulleys 84 and the cables 86 to the work bench portion 24. This force is preferably nearly the same as the force of gravity upon the work bench portion 24. Thus, when the user grasps the handles 94, only a small amount of upward force is necessary to move the work bench portion 24 upwardly.

As the work bench portion 24 moves upwardly, the extensions 64 slide upwardly out of the risers 62. At the same time, the wheels 68,70 guide the work bench portion 24 along the base portion 22, ensuring that it moves vertically and does not tip or bind.

When the work bench portion 24 is raised, the user releases the handles 94. At that time, the biasing force is preferably sufficient to maintain the work bench portion 24 in its raised position. However, in a preferred embodiment the work station 20 includes at least one locking mechanism for locking the work bench portion 24 in its raised position. The locking mechanism may comprise, for example, one or more pins (not shown) which extend through a portion of the work bench portion 24 into engagement with the base portion 22. Of course, such a locking mechanism is preferably dis-engaged before moving the work station 20 back to its collapsed position.

In a most preferred embodiment of the invention, the biasing force is user adjustable. As will be appreciated, the total weight of the work bench portion 24 may change. For example, the work bench portion 24 may have a first lower weight when no tools are associated with the work back 32. However, the work bench portion 24 will have a higher, second weight after a user associates a number of tools or work pieces with the work back 32.

In a preferred embodiment, the means for adjusting the biasing force comprise a spring pre-load mechanism. In one embodiment, a first end of each spring 72 is mounted or secured to its associated shaft 78,80. A second end of each spring 72 is preferably adjustably mounted to its associated shaft 78,80, such as via a collar 96. The collar 96 is connected to the spring 72 and can preferably be twisted or rotated relative to the shaft 78,80. As the collar 96 is twisted one direction, it increases the pre-load on the spring 72 (thus increasing the biasing force) and when it is twisted in the other direction, it decreases the pre-load on the spring 72 (thus decreasing the biasing force). Thus, a user may change the position of the collar 96 of either or both springs 72 to change the pre-loading thereof, and thus the associated biasing force, as necessary based upon the weight of the work bench portion 24.

In one embodiment, at least one handle or crank 104 is associated with each shaft 78,80. Preferably, each crank 104 is mounted on its respective shaft 78,80 beyond or outside of the pulley 84. Each crank 104 can be manually turned to cause its associated pulley 84 to move its associated cable 86 to lift the work bench portion 24. Preferably, the hand cranks 104 are located adjacent to the base portion 22 so that the work bench portion 24 can be raised and lowered without hitting the hand cranks 104. In another configuration, the hand cranks 104 may be selectively connected to the shafts 78,80 or pulleys 84 (such as via a mount which allows the crank to be connected and disconnected as needed).

In a preferred embodiment, the work station 20 has a safety design. In particular, as illustrated in FIG. 2, when the work bench portion 24 is lowered, in its lowest position the top thereof is spaced from the work surface 26 of the base portion 22. Thus, if a user's hand, arm, head or the like is inside of the interior area 34 of the work bench portion 24 and above the work surface 26 when the work bench portion 24 is lowered, the work bench portion 24 will not close down on the user. Instead, a safety gap remains between the work surface 26 and the work bench portion 24.

A particular advantage of the design of the work station 20 is that tools and other work pieces can be stored on the work back 32 even though the work bench portion 24 is movable. In particular, the work back 32 is preferably spaced rearwardly from the back 42 of the base portion 22, thus providing a tool storage gap or area between the back 42 of the base portion 22 and the work back 32. Thus, when a user lowers the work bench portion 24, the tools and other work pieces move downwardly with the work back 32 into a stored position without having to remove them from the work back. At the same time, when the user raises the work back portion 24, the tools and other work pieces become accessible, as illustrated in FIG. 3.

Another advantage of the work station 20 is that it can be used to secure tools or work elements. For example, when the work station 20 is in its raised position, a user might lock the doors 90,92 to secure the interior area 34 of the work bench portion 24, including the tools on the work back 32 and on the work surface 26. In addition, the user might lock one or more of the drawers 54 or other interior areas 28 of the base portion 22.

In addition, the work station 20 can be entirely secured in its collapsed position. In this position, the tools on the work back 32 are located between the work bench portion 24 and the base portion 22. Tools or work pieces on the work surface 26 are located in the closed interior space 34 of the work bench portion 24, as is the entirely of the base portion 22. In a preferred embodiment, the work station 20 may include at least one locking mechanism for locking the work bench portion 24 in its collapsed, second position, preventing it from being raised. For example, the locking mechanism might comprise a simple swing plate which slides over a "U"-shaped mount which accepts a padlock. Of course, other more complex locking mechanisms might be utilized, such as deadbolt type locks, rotating latches and the like.

In a configuration where the work station 20 is lockable or defines lockable areas, the work station 20 may be used as a "kit" which can be safely transported from one location to another. For example, a business may wish to ship a work station 20 preloaded with particular tools and workpieces from a home office to a remote field location. The business may pre-configure the work station 20 into the desired configuration, with the desired tools and workpieces. The work station 20 may then be locked or secured and then shipped. During shipping, the tools and workpieces are protected from theft or loss due to the secure nature of the work station 20. In addition, when the work station 20 arrives at the field, the user has all of the necessary tools, workpieces and a work platform to perform the necessary work. When the job is complete, the user may replace all of the tools and associated elements (such as replaced parts, etc.), re-secure the work station 20 and ship it back.

In this manner, the work station 20 may be configured for specific jobs/uses and then be configured for other jobs uses. For example, a work station 20 might be pre-configured for a first job, such as replacing an airplane oil pump (using a specific first set of associated tools and parts). After that first job, the work station 20 may be returned and then be preconfigured to a second job, such as replacing an airplane door latch (using a specific second set of associated tools and parts). This feature permits the work station 20 be pre-configured for specific uses, thus ensuring that the proper tools (and/or parts) are ready for the user and avoiding having other tools and parts be associated with the work bench (thus making it more difficult to determine which tools/parts are needed and also avoiding the risk of loss of unneeded tools and parts).

In one embodiment, the work station 20 may be configured with markings, mounts or other elements for specifically tracking tools and/or parts. For example, in one embodiment, different work backs 32 may be associated with the work station 20. Each work back 32 may have a different configuration, such as different tool mounts, different brackets or other supports for different tools or the like, whereby different tools or sets of tools may be readily associated with different work backs 32. Such different work backs 32 may also include tool or part outlines or the like, such as printed on the surface(s) thereof. Such markings or outlines may indicate where particular tools or parts are to be associated with the work back. The markings or outlines may be similar in shape to the particular tool or part which is to be stored in that particular location, thus aiding the user in associating the correct tool with the correct location.

Figure 5:
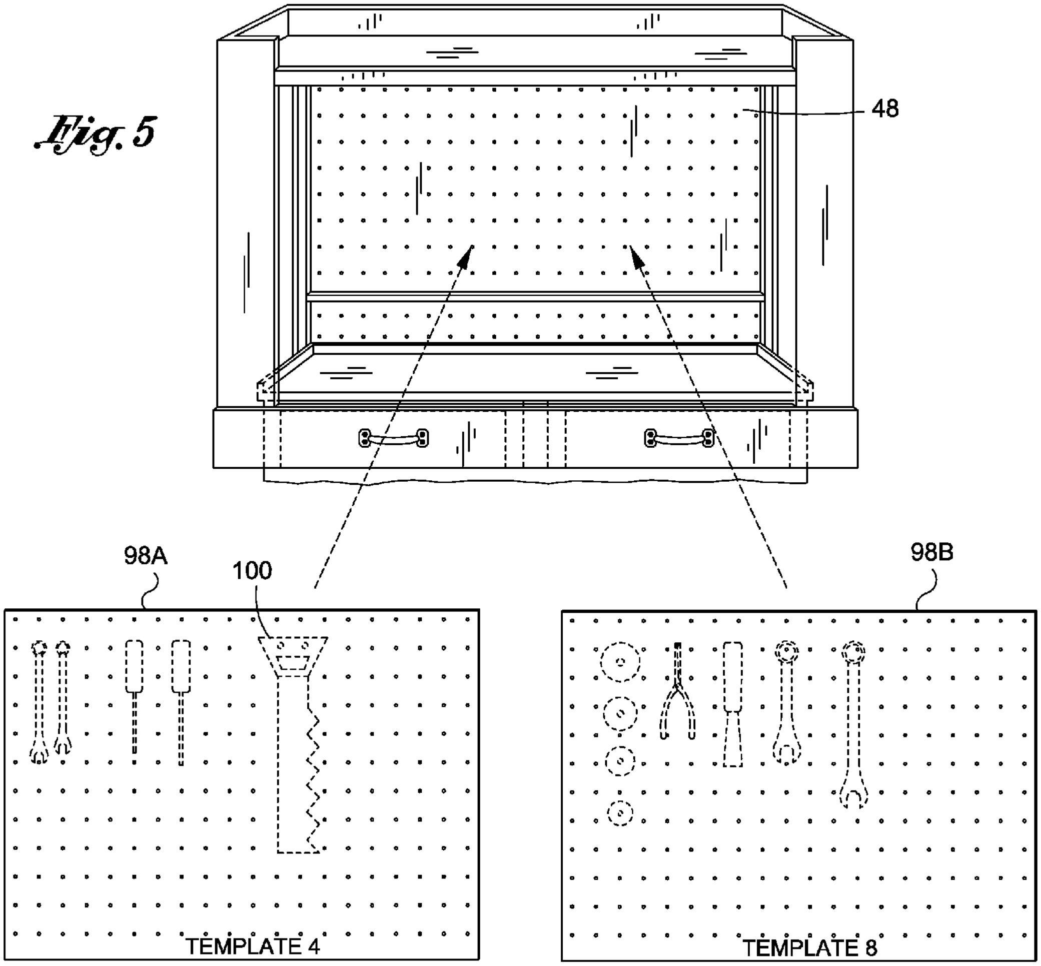
FIG. 5 illustrates the use of templates with the work station of the invention.

In another embodiment, referring to FIG. 5, different templates 98A,B or the like may be associated with a single work back 32. For example, a template 98A,B may comprise a printed sheet which can be mounted over the front of the work back 48. The template may be printed to show a variety of specific tools/parts and desired locations. Of course, each template may be different depending upon the desired combination of tools/parts. The templates may be removed and/or replaced as the work station 20 is prepared for different applications. For example, the work back 32 might include mounts, such as clips, for hanging the templates 98A,B at the front thereof.

As another aspect of the invention, different storage elements may be custom-configured for particular applications. For example, the storage elements may similarly be preconfigured with markings or mounts for particular tools or be configured to accept templates or the like. As one example, a template may be located on the planar surface of the shelf. The template may mark the location of specific tools or parts.

Figure 6:
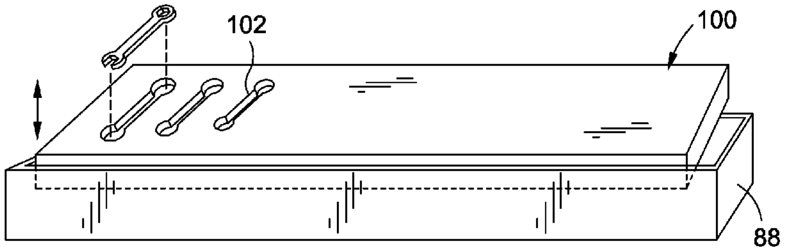
FIG. 6 illustrates the use of marked inserts for storage elements of the work station of the invention.

In another configuration, the storage elements may include specifically shaped storage locations for one or more tools/parts. For example, a drawer may be molded to have different storage locations for sockets, screwdrivers, wrenches or the like. In other embodiment, as illustrated in FIG. 6, a drawer 54 may accept different inserts 100, such as plastic or foam inserts which have associated storage locations 102 defined in them (such as by molding, cutting or the like). Of course, different storage elements and/or different inserts 100 may be used depending upon the configuration of the tools and/or parts which are to be associated with the work station 20.

Of course, the work back 32, templates 98A,B, storage elements or associated inserts, etc. may have other configurations. For example, they may be printed or include tool numbers, part numbers or other information for specifically identifying tools, parts and/or jobs.

In use, the work back 32 and/or storage elements may be configured for a specific set of tools and/or parts, such as by associating the above-described templates. The associated tools and/or parts are preferably then associated with the work station 20 in the indicated positions. The work station 20 may then be transported and/or used, such as to perform a particular task. When the task is complete, the tools and/or used parts are preferably returned to the designated locations. One particular advantage of this aspect of the invention is that a user can see where each tool and/or part is supposed to go and a visual inspection will readily reveal if tools or parts are missing (because tools and/or parts are missing from their designated location(s).

In this regard, the work station 20 can be used not only to expedite a particular job by being pre-configured with the necessary tools and parts, but the loss of tools and parts can be minimized.

In one embodiment, the overall dimensions of the work station 20 may be carefully controlled so that it can readily be moved and/or shipped. In a preferred embodiment, the work station 20 is no more than about 24-36 inches, and most preferably about 30 inches, deep from front to back and no more than about 70-82, and most preferably about 76 inches, high (even when extended/raised), so that it can be rolled through most doorways.

Of course, the work station 20 may have other configurations and features. As indicated, in a preferred embodiment the means for biasing includes two springs 78,80. One advantage of this configuration is that each spring 78,80 are associated with a different "drive" shaft. As a result, each spring 78,80 generate its own biasing force which is equally transmitted to both ends/sides of the work bench portion 24 (via a pulley 84 and cable 86 at each end). Thus, if one spring were to break, the remaining spring would still generate a biasing force which is spread across the work bench portion 24 (i.e. since the springs are on different shafts, if one spring breaks such does not result in a "binding" effect as would occur if only one spring were used with one shaft or two springs were used with one shaft).

However, other means for biasing could be used in conjunction with other inventive aspects of the work station 20. For example, it is possible to use hydraulic pistons, electric pistons, motor driven pulleys/cables, movable screws or other mechanisms to move the work bench portion 24 or to aid a user in moving the work bench portion.

It will also be appreciated that the configuration of the base portion 22 and work bench portion 24 might vary. For example, the work station 20 might be generally square in cross-sectional shape rather than rectangular (or have other shapes). Also, the particular construction of the housing 38 and frame 60 might vary. In one embodiment, portions of the housing 38 and frame 60, such as the end frames 66*a,b* may be constructed from metal tubing, such as square metal tubing. However, other materials may be used.

In one embodiment, means for moving comprise mating risers 62 and extensions 64. As indicated, other mechanisms could be used. For example, in one embodiment four risers 62 might be located at the corners of the base portion 22 for engagement with four extensions 64 which are similarly located at the corners of the work bench portion 24.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A securable work station comprising:

a base portion comprising a housing having a bottom, one or more sides and a top, a generally planar work surface located at said top of said housing and one or more storage areas defined by said housing below said top; and a work-bench portion movably mounted relative to said base portion, said work-bench portion having one or more peripheral sides and defining an interior area, at least one of said peripheral sides defining a generally vertical work back at a rear of said interior area upon which a plurality of tools may be mounted, said work-bench portion configured to move between a first lowered position in which said work-bench portion extends over and covers said base portion with said housing of said base portion located within said interior area of said work-bench portion, whereby said securable work station has a first height, and a second raised position in which said work-bench portion is raised upwardly relative to said base portion and said securable work station has a second height which is greater than said first height and said one or more storage areas of said base portion are accessible below said work-bench portion, said work back extends upwardly from said top work surface of said base portion, and said interior area of said work-bench portion defines a generally open work space above said generally planar work surface.

2. The securable work station in accordance with claim 1 wherein said housing of said base portion has a first side, an opposing second side and a rear which are generally closed and wherein said one or more storage areas are accessible from a front of said housing.

3. The securable work station in accordance with claim 2 wherein said one or more storage areas comprise drawers which are extendable outwardly of said front of said housing.

4. The securable work station in accordance with claim 1 wherein said work-bench portion has a first side and a second side, said rear and an opposing front, wherein said first side, said second side and said rear are generally closed.

5. The securable work station in accordance with claim 4 wherein said front of said work-bench portion is defined at least partially by one or more doors which are movable from a first closed position in which said front is generally closed and access to said interior area is prevented and a second open position in which said front is open and access to said interior area is permitted.

6. The securable work station in accordance with claim 4 wherein when said work-bench portion is in said lowered position said first and second sides, said rear and said front thereof extend over and enclose said housing of said base portion and wherein said generally planar top work surface of said base portion is positioned adjacent to a top of said work-bench portion.

7. The securable work station in accordance with claim 1 wherein said base portion is rollably mounted on one or more wheels.

8. The securable work station in accordance with claim 1 further comprising means for biasing said work-bench portion to said raised position.

9. The securable work station in accordance with claim 8 wherein said means for biasing comprises at least one spring.

10. The securable work station in accordance with claim 1 further comprising at least one lock configured to retain said work-bench portion in said raised position relative to said base portion.

11. The securable work station in accordance with claim 1 further comprising at least one user-engageable handle which, when rotated, raises said work-bench portion upwardly from said lowered position to said raised position.

12. A collapsible work station comprising:

a base portion having a first side, an opposing second side, a front and an opposing rear, and a top and an opposing bottom, said top comprising a generally planar work surface, said first side, said second side and said rear being closed, and a plurality of storage elements accessible at said front, said plurality of storage elements movable from a first position in which they are located in a closed interior of said base portion and a second position in which they extend outwardly from said front of said base portion;

a work-bench portion which is movably mounted relative to said base portion, said work-bench portion having a first side, an opposing second side, a front and an opposing rear, and a top and an opposing bottom, said first side, said second side, said rear and said top of said work-bench portion being closed and said front being closed when at least one door is moved to a closed position, said work-bench portion defining an interior area, said work-bench portion movable from a first lowered position in which said base portion is located within said interior of said work-bench portion and said first side thereof is positioned over said first side of said base portion, said second side of said work-bench portion is positioned over said second side of said base portion, said rear of said work-bench portion is positioned over said rear of said base portion, said top of said work-bench portion is positioned over said top of said base portion, said base of said work-bench portion is positioned adjacent to said base of said base portion, and said front of said work-bench portion positioned over said front of said base portion, wherein access to said base portion, including said plurality of storage elements, is limited, and a raised position in which said work-bench portion is raised upwardly relative to said base portion to a position in which said base of said work-bench portion is positioned adjacent to said top of said base portion and said front of said work-bench portion is not located over said front of said base portion, whereby said plurality of storage elements may be moved outwardly of said front of said base portion, and wherein said interior area of said work-bench portion defines a work area above said generally planar work surface of said base portion.

13. The collapsible work station in accordance with claim 12 wherein said base portion is generally rectangular in peripheral shape and said work-bench portion is generally rectangular in peripheral shape.

14. The collapsible work station in accordance with claim 12 further comprising means for biasing said work-bench portion to said raised position.

15. The collapsible work station in accordance with claim 12 wherein said rear of said work-bench portion comprises one or more tool mounts at said interior area of said work-bench portion.

16. The collapsible work station in accordance with claim 12 wherein said base portion is rollably supported.

* * * * *